United States Patent Office 3,505,185
Patented Apr. 7, 1970

3,505,185
METHOD OF FORMING AN INTERELECTRODE SEPARATOR FOR AN ACCUMULATOR
Ernst A. Hausler, Duisburg-Rahm, Germany, assignor to Yardney International Corp., New York, N.Y., a corporation of New York
No Drawing. Filed Apr. 19, 1968, Ser. No. 722,533
Claims priority, application Germany, Apr. 20, 1967, F 52,201
Int. Cl. C23b 9/00
U.S. Cl. 204—56    9 Claims

ABSTRACT OF THE DISCLOSURE

Improvement in the formation of an interelectrode separator for an accumulator by precipitating an alkaline earth metal hydroxide on a cathode with the substantial absence of hydrogen evolution by electrolysis in an aqueous electrolyte containing the ions of the desired alkaline earth metal hydroxide and a reducible ion having a redox potential which is more positive than the redox potential of the alkaline earth metal ions and by adjusting the electrolyte pH value which is lower than the pH at which such an alkaline earth metal hydroxide is precipitated spontaneously.

---

The invention relates to a novel method of manufacturing a separator for alkaline accumulators. It more particularly refers to improvements in separator production by an electrochemical deposition of an alkaline earth hydroxide coating on the electrodes, wherein an electrolysis takes place between an insoluble electrode and a cathodically connected electrode to be coated with the separator coating in an electrolytic bath which contains the alkaline earth metal ions to be deposited. The object of the process is to produce a uniform coating in a rapid manner.

Simple spacers have been made in the form of paper strips, paper felt or synthetic felt. In addition, in alkaline accumulators semi-permeable separators made of cellulose or polyvinyl alcohol have been used. These semi-permeable separators, however, have the disadvantage that they have little resistance to oxidation. Furthermore, these polymeric separators cannot be exposed to high temperatures without detrimental effects setting in. For certain uses, for example, in space applications accumulators must be sterilized by a thermal treatment at about 120° C. This is impossible with accumulators which have organic separators.

It has been proposed to make use of inorganic separators. It is known to make separator sheets from inorganic ion exchange materials as for example zeolite or similar substances. Furthermore, it has been proposed to make separators out of inorganic polymers which contain phosphorous or zirconium. These separators have been made in a plate-shaped form using special carrier materials. The manufacture thereof however, is very complicated and expensive.

Still further it has been proposed to produce separators by depositing a coat of alkaline earth metal hydroxides directly onto the electrodes by electrochemical deposition. In these known processes, electrolysis takes place between an insoluble electrode and a cathodically connected electrode, which is to be coated with the separator. Electrolysis takes place in an electrolyte which contains alkaline earth metal ions to be deposited. The electrolyte consists of a solution of calcium or magnesium acetate buffered with calcium or magnesium hydroxide. During the electrolysis, a deposition of calcium hydroxide takes place on the pertinent electrode accompanied by the evolution of hydrogen. Hydrogen evolution, however, interferes in a detrimental fashion, with a uniform deposition of the separator material onto the electrodes. A uniformly adherent coating is therefore impossible i.e., cannot be obtained using this method.

The object of the invention is to improve the known method for electrochemically depositing an alkaline earth metal hydroxide coating on the electrode in such a manner as to produce a uniform coating thereof and that in a short time.

Other and additional objects of this invention will become apparent from a consideration of the entire specification including the claims hereof.

In accord with and fulfilling these objects, one aspect of this invention resides in an electrolytic deposition of an alkaline earth metal hydroxide separator on an electrode in a prior art manner, with the added improvement of carrying out this process using an electrolyte which additionally contains reducible ions whose redox potential is more positive than the deposition potential of alkaline earth metal ions and of hydrogen evolution; and by operating with an electrolyte pH which is lower than the pH at which the alkaline earth metal hydroxides are precipitated.

By operating this process with such improved electrolyte, hydrogen ions are consumed at the cathode by means of reducible ions so that there is no hydrogen evolution. Moreover, there develops at the cathode a shift of pH which leads to precipitation of the alkali earth metal hydroxides without a concurrent evolution of hydrogen as in the prior art.

According to a preferred aspect of this invention, the electrolyte comprises a solution of calcium nitrate which is adjusted to a pH of about 11.5 by the addition of calcium hydroxide. During electrolysis, nitrate ions are reduced to ammonium ions while hydrogen ions are consumed. Evolution of hydrogen at the cathode can therefore not take place as long as nitrate ions are present in the electrolyte. At the same time there is a deposition of calcium hydroxide as desired.

It is suitable to provide the reducible material in a concentration of about 200 grams of calcium nitrate per liter, preferably at saturation.

The invention can be explained in greater detail by means of the following example, the same is not however to be construed as limiting the invention in any manner.

EXAMPLE

A silver electrode made of silver powder having a porosity of about 50% is used as cathode. An electrode made of a non-corrodible material such as stainless steel is used as the anode. The electrolyte consists of a calcium nitrate solution buffered with calcium hydroxide. The concentration amounts to about 200 grams of calcium nitrate per liter. When enough hydroxide is added so that a precipitate is formed, the electrolyte pH is automatically adjusted to 11.5.

When the silver electrode is polarized cathodically at a current density of 50 ma./cm.$^2$, the surface of the electrode becomes coated with calcium hydroxide after 10 minutes. The thickness of the coating is about 0.02 mm. Deposition starts within the pores of the silver electrode and then progresses outwardly toward the surface.

Because of the fact that the deposition first starts within the pores, the deposited separator coating adheres very well to the electrode.

The invention is in no way limited to the example given but is applicable to many modifications while remaining within the scope of the invention. For example, the thickness of the separator coating can be varied by changing the current density and the time, of electrolysis. It is also possible to use magnesium or other alkaline earth metal instead of calcium.

What is claimed is:

1. In a method of forming an interelectrode separator for an accumulator by precipitating an alkaline earth metal hydroxide on a cathode by electrolysis in an aqueous electrolyte comprising the ions of said alkaline earth metal hydroxide; the improvement which comprises carrying out the precipitation with the substantial absence of hydrogen evolution in an electrolyte which additionally contains a reducible ion having a redox potential which is more positive than the redox potential of said alkaline earth metal ions and by maintaining the pH of said electrolyte lower than the pH at which the alkaline earth metal hydroxide is precipitated spontaneously.

2. The improved process of claim 1 wherein said alkaline earth metal is calcium.

3. The improved process of claim 1 wherein said reducible ion is nitrate.

4. The improved process of claim 2 wherein said electrolyte pH is about 11.5.

5. An electrolyte comprising a solution of an alkali earth metal hydroxide and a reducible ion having a redox potential which is more positive than the deposition potential of said alkali earth metal hydroxide which solution has a pH which is lower than the pH at which said alkali earth metal is precipitated.

6. An electrolyte as claimed in claim 5 wherein said reducible ion is nitrate.

7. An electrolyte as claimed in claim 5 wherein said pH is about 11.5.

8. An electrolyte as claimed in claim 5 wherein said alkali earth metal is calcium.

9. A separator prepared by the process according to claim 1.

References Cited

UNITED STATES PATENTS 3,054,732   9/1962   McQuade _____ 204—37

FOREIGN PATENTS 613,025   1/1961   Canada.

HOWARD S. WILLIAMS, Primary Examiner

R. L. ANDREWS, Assistant Examiner